Nov. 7, 1950          J. L. SULLIVAN          2,528,672

ALL PURPOSE VEHICLE CARRIER AND LOADER

Filed May 17, 1948          2 Sheets-Sheet 1

James L. Sullivan
INVENTOR.

Nov. 7, 1950      J. L. SULLIVAN      2,528,672
ALL PURPOSE VEHICLE CARRIER AND LOADER

Filed May 17, 1948      2 Sheets-Sheet 2

James L. Sullivan
INVENTOR.

Patented Nov. 7, 1950

2,528,672

UNITED STATES PATENT OFFICE 2,528,672

ALL PURPOSE VEHICLE CARRIER AND LOADER

James L. Sullivan, Clinton, Okla.

Application May 17, 1948, Serial No. 27,544

2 Claims. (Cl. 214—75)

This invention relates to portable lifting devices and is used to elevate mechanical equipment for transportation from one point of use to another and a primary object of the invention is to provide means to readily move large and bulky equipment with a minimum of effort.

Another object of the invention is to adjust the width of the space available to accommodate equipment of various sizes in a simple and efficient manner without weakening the structure or modifying the device in any way.

Yet another object of the invention is to provide means to support the weight of the object being transported and thereby relieve the hoisting mechanism from carrying the bulk of the load.

And another object of the invention is to secure the lifting device to a motor vehicle or the like in adjustable manner to compensate for the unevenness of the terrain, thereby avoiding jarring of the equipment being carried with the possibility of it breaking loose, or otherwise being damaged.

Other objects of the invention reside in the detail of construction and in the combination of the various parts and in their mode of operation, as will hereinafter appear.

The following is a detailed description of a preferred embodiment of the invention and is illustrated in the attached drawings, wherein—

Figure 1:
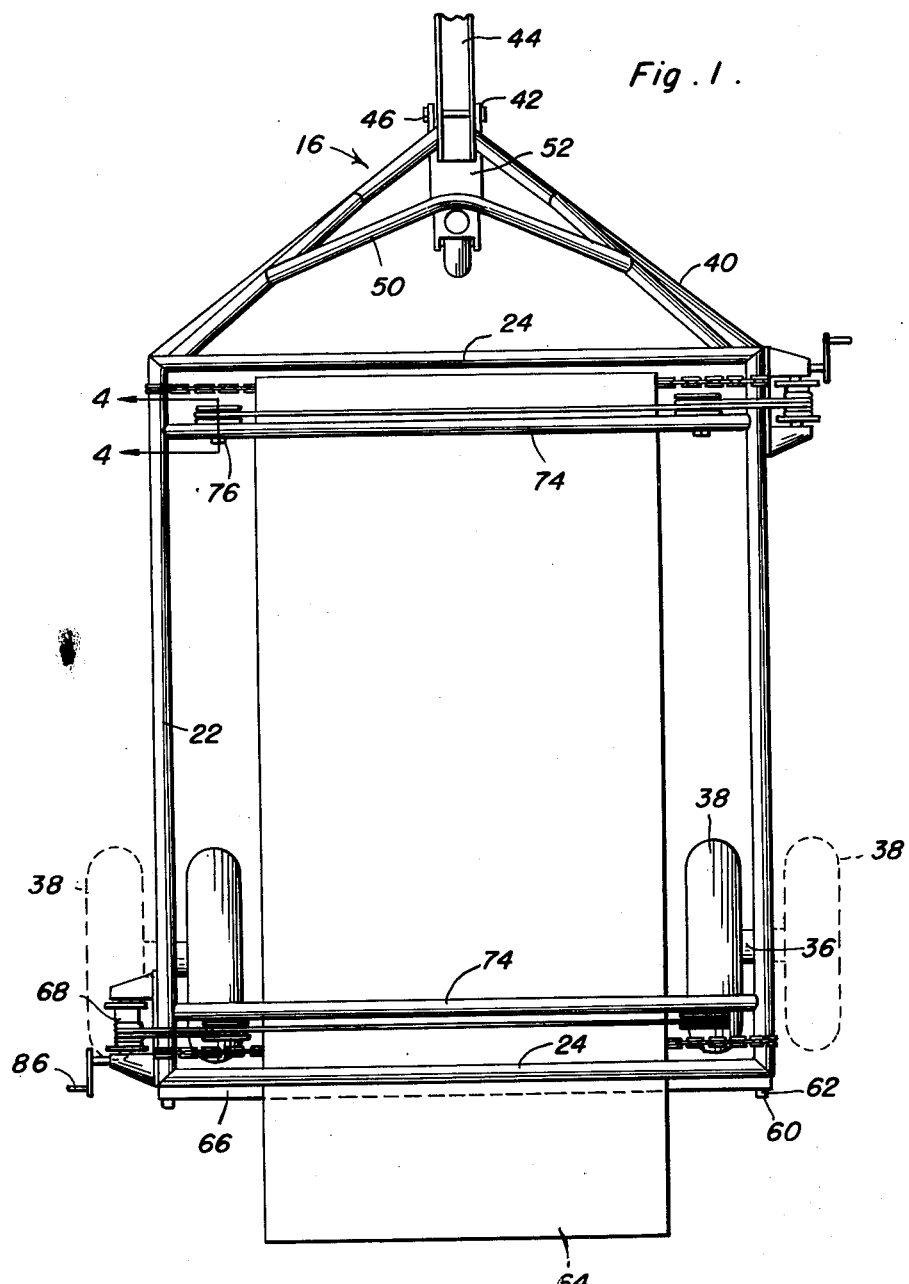
Figure 1 is a top plan view of the portable lifting device.
Figure 4:
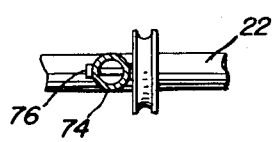
Figure 4 is a detail of the hoisting mechanism and is taken substantially on line 4—4 of Figure 1.

Referring to the figures, the invention is indicated generally by the numeral 10 and includes a frame 12 and hoisting mechanism 14. A hitch 16 is secured to the frame for connection with a motor vehicle or other suitable source of power.

The frame 12 is of open construction and consists of a pair of spaced vertical tubular pipes 18 at the rear end thereof and a similar pair of spaced, tubular pipes 20 at the front end of the frame 12. Pipes 18 and 20 are joined at the upper surface thereof by transverse pipes 22, pipes 22 being integrally welded to the upper extremities of pipes 18 and 20. Each pair of pipes 18 and 20 are secured by an integral transverse pipe 24. The lower free extremities of pipes 18 and 20 are joined by a channel iron bar 26. A transverse tubular pipe 28 joins channel irons 26 at the forward end thereof. It is to be noted that the rear bottom of frame 12 includes narrow transverse member for bracing or supporting the device. Vertical braces 30 are secured in horizontal relation to pipes 18 and 20 to strengthen and support frame 12. Of course, as many braces as may be desired may be supplied, although it is found that the four illustrated in Figure 2 adequately serve the intended purpose.

Braces 30 terminate at the lower end thereof in an enlarged shoulder portion 32, upon which I-beam 26 rests. In addition, tubular flange 32 is transversely bored at 34 to receive stub shaft 36 of wheels 38. Wheels 38 are thereby mounted adjacent the open rear end of frame 12 and are adjustable in that they are removed from the inside of frame 12, as indicated in full lines in Figure 2, and are installed on the outside of the frame as is clearly illustrated in dotted lines. In this manner the width of frame 12 is capable of adjustment in order to accommodate larger bodies or equipment to be transported without the necessity of laterally adjusting the frame nor supplying involved mechanical structure to accomplish the identical results.

Figure 3:
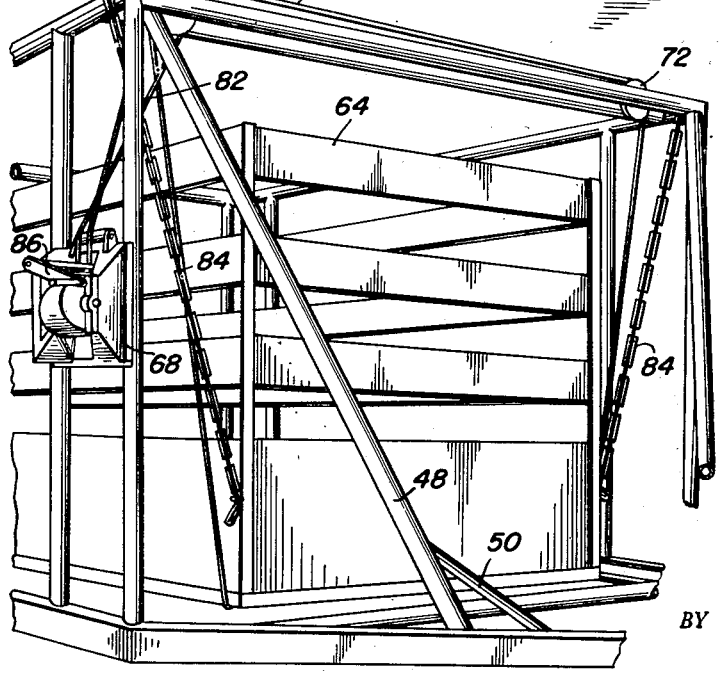
Figure 3 is a perspective view of the invention shown with mechanical equipment in hoisted position.

As is best illustrated in Figures 1 and 3, channel irons 26 extend beyond the front end of frame 12 and taper to form a triangular hitch 40. Hitch 40 terminates in apertured ears or flanges 42 for pivotally retaining a channel iron hitch 44 apertured at one end thereof in alignment with the apertures of flanges 42 for retention therein by means of a double headed bolt 46. Angularly positioned tubular pipes 48 connect clevis 40 with frame 12 in order to brace and strengthen the structure. A bent pipe 50 is welded to a bracket 52, bracket 52 being welded to clevis 40. A depending leg 54 is secured to hitch 40 and includes forked fingers 56 for mounting therebetween an airplane tail wheel 58 to support frame 12 when in rest position.

Figure 2:
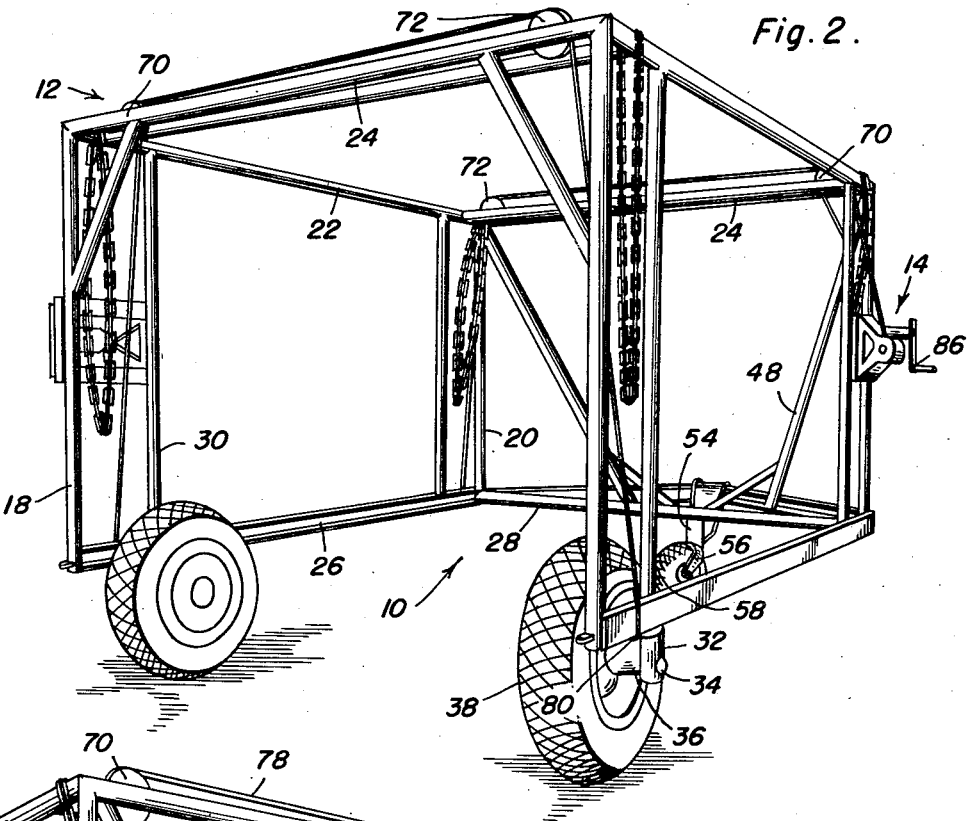
Figure 2 is a perspective view of the invention.

It will be noted, as is clearly shown in Figures 1 and 2, that ears 60, apertured at 62 are secured to frame members 18 at the bottom extremities thereof. This structure is provided in the event that an especially elongated body 64, such as is depicted in Figure 3, extends through the open rear end within loader 10. In that event, a supplementary supporting bar 66 is secured to ears 60 to provide compensating support means for the extending rear end of body 64.

The mechanism for hoisting body 64 is a winch and cable assembly retained in a suitable housing 68 supported between tubular pipes 18 and 20. A pair of sheaves 70 and 72 are secured to transverse bars 74, by means of a double headed bolt 76. Bars 74, in addition to housing the sheaves of the winch assembly, serve the double function of bracing frame 12 against buckling or lateral shifting thereof. It will be noted that winch assembly 68 is placed on opposite sides of frame 12. This construction will necessarily compensate for the tendency of the body being lifted from shifting sideways during the process. Cable 78 extends from housing 68 over the sheaves 70 and 72 to terminate in a hooked free end, 80. A second, shorter cable 82 is trained around sheath 70 only and also terminates in a hooked free end. In this manner, body 64 is grasped securely by hooks 80, on all four sides in order to be hoisted. A support chain cable 84 is secured to frame 12 and is employed to retain the body being transported in raised position, thereby relieving strain on cables 78 and 82. A handle lever 86 engages the winch construction for actuation of the cable.

In use, hoise device 10 is backed into position to enclose a device to be transported. Cables 78 and 82 are then secured to the bottom extremities of the object by means of hooks 80 and the winch assembly is actuated to raise body 64. When it has achieved the desired position, chain cables 84 are secured thereto, thereby relieving strain on the hoisting assembly. Obviously, if the body is of considerable length, bar 66 is secured to the open rear end of frame 12 to provide additional support. In the construction of the device, there is three point support provided by wheels 38 and 58, after which the device is secured to a tractor or truck, or other source of power. Wheel 56 is then raised from the ground and loader 10 is transported on wheels 38. Channel iron hitch 44 is adjustable to compensate for any unevenness of the ground travel to prevent jarring and accidental displacement of the articles being carried. If desired, wheel 38 may be reversed to the outside of frame 12 to accommodate wider bodies than is usually transported.

Of course, any suitable material may be employed in the construction of the invention and means may be provided to adjust the height of frame 12, if so desired.

While a preferred embodiment of the invention has been shown and described, it is to be understood that various changes in size, shape and arrangement of parts may be made without departing from the spirit of the invention and scope of the appended claims.

Having described the invention, what is claimed as new is:

1. A vehicle carrier and loader comprising a substantially rectangular upper tubular frame, a substantially U-shaped lower frame, spaced tubular vertically extending rods securing said frames together, hoist means carried by said upper frame for engaging a vehicle to be transported, wheels having stub axles and means for simultaneously removably pivoting said stub axles adjacent the free ends of said U-shaped lower frame and for bracing said frames, said means including vertically extending pipes secured at their upper ends to said upper frame, and enlarged shoulders at the lower ends of said pipes for seating the legs of said U-shaped lower frame, said shoulders including transverse bores for journaling said stub axles.

2. The combination of claim 1 and chain means carried by said upper frame adapted to engage a vehicle to be transported to relieve strain on said hoist means.

JAMES L. SULLIVAN.

REFERENCES CITED

The following references are of record in the file of this patent:

UNITED STATES PATENTS

| Number | Name | Date |
|---|---|---|
| 2,427,667 | Gilbert | Sept. 23, 1947 |
| 2,444,690 | Almendinger et al. | July 6, 1948 |
| 2,448,119 | Peterson | Aug. 31, 1948 |
| 2,457,395 | Owens | Dec. 28, 1948 |